United States Patent Office 3,132,163
Patented May 5, 1964

3,132,163
CORTICOSTEROID HEMIACETALS AND DIHEMI-
ACETALS AND THEIR ESTERS
Poul Borrevang, Copenhagen, Denmark, assignor to
Lovens Kemiske Fabrik ved A. Kongsted, Ballerup,
Denmark, a firm
No Drawing. Filed May 22, 1961, Ser. No. 111,444
Claims priority, application Great Britain May 27, 1960
3 Claims. (Cl. 260—397.45)

This invention relates to novel therapeutically usable derivatives of corticosteroids, which derivatives have the general formula:

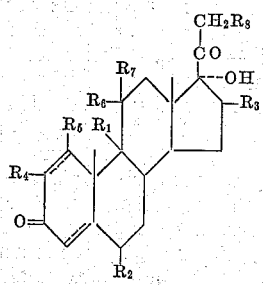

(I)

in which $R_1$ is selected from the class consisting of hydrogen and α-halogen atoms, $R_2$ is selected from the class consisting of hydrogen, an α-chloro-, an α-fluoro, an α-methyl group, and an α-methyl group substituted by 1–3 fluorine atoms, $R_3$ is selected from the class consisting of hydrogen, an α-methyl-, a β-methyl-, an α-hydroxy group, and an acetal- and a ketal group formed with the hydroxy group present in the 17-position, $R_4$ is selected from the class consisting of hydrogen, an α-fluoro, an α-methyl-, an α-methyl group substituted by 1–3 fluorine atoms, and a double bond formed together with $R_5$, $R_6$ is selected from the class consisting of hydrogen and, together with $R_7$, an oxygen atom, $R_7$ is selected from the class consisting of hydrogen, an α-hydroxy group, a β-hydroxy group and $R_8$ and $R_8$ designates a hemiacetal group having the formula:

(II)

in which $R_9$ is an aliphatic radical which is unsubstituted or substituted with members of the group consisting of halogens, aromatic and heterocyclic groups and $R_{10}$ is a free or esterified hydroxy group.

From this it will be understood that the novel derivatives of the invention are corticosteroid-21-hemiacetals or corticosteroid-11,21-dihemiacetals and esters thereof.

17-testosterone-chloral-hemiacetal and its esters have previously been described. These substances possess the anabolic and androgenic properties of testosterone, but exhibit a greater potency than testosterone and its hitherto known derivatives, and furthermore the esters of testosterone-chloral-hemiacetal have proved to be very usable in the preparation of pharmaceuticals for particular purposes.

According to tests carried out in connection with the present invention it has similarly been found that also the physiological activity of the corticosteroids is retained or improved when the 21- or the 11,21-hydroxy groups thereof are transformed into hemiacetal groups or into hemiacetal ester groups and that the esters thus formed possess advantageous properties in the making of pharmaceutical preparations for particular therapeutical purposes as hereinbelow described.

Thus the present invention specifically relates to derivatives containing steroids which possess themselves biological activity, such as cortisone, hydrocortisone, prednisone, prednisolone, 9α-fluoro- or 9α-chloro-cortisone, 16α- or 16β-methyl-cortisone, 16α-hydroxy-cortisone, 9α-fluoro- or 9α-chloro-cortisone, 16α- or 16β-methyl-cortisone, 16α-hydroxy-cortisone, 9α-fluoro-, chloro or bromo-cortisone, 16α-methyl-hydrocortisone or 16β-methyl-hydrocortisone, 16α - fluoro - hydrocortisone, 6α-methyl-prednisolone or prednisone, 6α-fluoro-prednisoline or prednisone, 9α-fluoro - prednisolone, or prednisone, 9α - fluoro-16α-hydroxy-prednisolone, 9α-fluoro-16α-hydroxy-prednisolone-16,17-acetonide or similar compounds.

Particularly the invention concerns derivatives of the steroids referred to hereinbefore, which are 21-hemiacetals or 11,21-hemiacetals or certain simple aldehydes among which are chloral, butyrchloral or other halogenated aliphatic aldehydes, and aliphatic aldehydes substituted by aromatic and heterocyclic groups such as phenoxyacetaldehyde and pyridyl-aldehyde.

Other steroids and aldehydes than those mentioned in the foregoing may however be used as components in the derivatives, the invention being meant to cover in general biologically active derivatives of the general Formula I mentioned hereinbefore.

Furthermore, the invention relates to a method for producing such hemiacetals or dihemiacetals of the invention, in which method a corticosteroid corresponding to Formula I with the exception that in place of $R_8$ it has a hydroxyl group and that in place of $R_7$ it has any member of the class mentioned except $R_8$, is reacted with an aliphatic aldehyde which may contain as substituents one or more halogen atoms, an aromatic group or a heterocyclic group, or with a reactive derivative of such an aldehyde, whereafter the corticosteroid-hemiacetal- or dihemiacetal thus obtained is isolated and purified by recrystallization, or, when esters are desired, the hemiacetal- or dihemiacetal formed by the aforementioned reaction is further reacted with an acylating agent containing the acyl group corresponding to the acid with which the said hemiacetal or dihemiacetal is to be esterified.

The reaction can be carried out in diluted solutions for instance by dissolving the corticosteroid in question in a suitable amount of a suitable solvent before adding the aldehyde, or the aldehyde may itself be used as the solvent, whereafter the mixture is left standing at a suitable temperature for the period of time required to accomplish the desired reaction.

As is well known, aldehydes and alcohols commonly can be made to react under suitable conditions so as to produce acetals in high yields, and many aldehydes may be used in the method of the present invention. It is furthermore known that on reaction with water some aldehydes are converted into hydrates, a reaction analogous to the formation of acetals, so that the aldehydes capable of forming hydrates are usually capable of easily forming acetals or hemiacetals also.

The reaction in question generally proceeds easily, even at room temperature, in which latter case the reaction mixture is left standing overnight or for a couple of days in order to accomplish the desired degree of reaction, but the reaction may also be performed at other temperatures and in a shorter time.

The aldehyde can be used as such or in the form of a reactive derivative of the aldehyde concerned, for which purpose the hydrate is particularly suitable.

In the method of the present invention the aldehyde may be added in amounts equivalent to the amount of steroid compound used, or there may be added an excess of the aldehyde. In this connection it should be mentioned that in the absence of catalysts, the 17-hydroxy group and the possible 11β-hydroxy group present in the molecule are quite unaffected during the reaction, even though an excess of the aldehyde may be present in the reaction mixture.

On the other hand, if the corticosteroid used as starting material contains an hydroxy group in the 11α-position of the molecule, and if the reaction is performed in the presence of an excess of the aldehyde, a hemiacetalization may take place both in the 11- and in the 21-position.

During the reaction the hemiacetal may precipitate or, if necessary, it can be caused to precipitate after the conclusion of the reaction by adding to the mixture a component reducing the solubility of the reaction product. The hemiacetal is isolated, for instance by filtration, and the product thus obtained may be further purified by recrystallization or transferred to an ester by an acylation process performed in known manner.

In some cases the process of purification is facilitated by esterification of the free hemiacetal before the recrystallization, the esters being in many cases capable of crystallizing more easily than the corresponding free hemiacetals.

Particularly it should be mentioned, however, that although the free hemiacetals are rather stable compounds and can be used as such, they are preferably used in the form of their esters, which in the presence of water are more stable than the free hemiacetals themselves.

Besides, some esters possess properties useful for particular therapeutical purpoes, the utilization of the physiological activity of a steroid compound depending in many cases on the form of administration used.

Thus, by esterification of the free hydroxy group of the hemiacetal with for instance amino acids or one of the carboxyl groups of succinic acid, esters of corticosteroid-hemiacetals are formed the salts of which with acids or bases respectively are readily soluble in water.

On the other hand esters of slight solubility may be formed by using other acids for esterification, for instance acetic acid.

Among the acid groups particularly suitable as constituents of such esters formyl-, acetyl-, propionyl-, butyryl-, isobutyryl, cyclopentyl-propionyl-, phenyl-propionyl-, enanthyl-, glycyl-, succinyl-, glutaryl-, or similar groups are preferred but others may lend themselves for use for the same purpose.

The invention will now be illustrated by the following examples:

EXAMPLE 1

Cortisone-21-Chloral-Hemiacetal 10 g. of cortisone were added at a temperature of 20° C. to 30 ml. of anhydrous chloral. The mixture was shaken for 17 hours, whereafter the partly solidified mixture was triturated with ether. The product precipitated was filtered and washed with ether. After drying at room temperature, 6.9 g. of the desired product were obtained. By dissolving this product in acetone and subsequently adding petroleum ether the desired substance was obtained as crystals with M.P. 175–176° C. The ultraviolet (U.V.) spectrum showed a maximum at 238 m$\mu$ (ethanol), $\epsilon$=15,500.

Calc.: C, 54.39; H, 5.76; Cl, 20.95. Found: C, 54.49; H, 5.99; Cl, 21.08.

From the mother liquor further 5.1 g. of the desired substance was obtained with M.P. 172–175° C.

EXAMPLE 2

Compound S-21-Chloral-Hemiacetal 3.6 g. of compound S were added at room temperature to 10 ml. of anhydrous chloral. The mixture was shaken, and after a short time the steroid dissolved. After further shaking for 18 hours, the mixture was partly solidified. Ether was added, and the mixture was filtered. The filter cake was washed with ether and dried at about 20° C., whereby 3.5 of the desired compound were obtained. By dissolving this product in acetone and adding petroleum ether the desired substance was obtained with M.P. 165–167° C., showing an U.V. maximum at 241 m$\mu$ (ethanol), $\epsilon$=16,300.

Calc.: C, 55.93; H, 6.33; Cl, 21.54. Found: C, 55.94; H, 6.26; Cl, 21.69.

EXAMPLE 3

Cortisone-21-Chloral-Hemiacetal Acetate

A mixture of 25 ml. of pyridine and 25 ml. of acetic anhydride was prepared in a flask, whereafter it was cooled by placing the flask in a cooling-bath consisting of carbon dioxide/acetone.

15 g. of cortisone-21-chloral-hemiacetal prepared as described in Example 1 were poured into the above mentioned mixture. By removing the flask from the cooling-bath for a short time and shaking it, a clear solution of the steroid compound in the mixture was obtained. This mixture was placed in a refrigerator for 48 hours at a temperature of −18° C. Thereafter the solution was poured into an ice/water mixture containing 40 g. of sodium acetate. After stirring for half an hour the mixture was extracted with ether. The etheral phase thus obtained was washed with water four times, subsequently dried with anhydrous sodium sulphate and evaporated to dryness on a water bath in vacuo. The residue was triturated with ether, and the product thereby precipitated was filtered off. After drying at room temperature, 7.4 g. of the desired substance were obtained, which after recrystallization from ethyl acetate had M.P. 19–197° C. and showed an U.V. maximum at 238 m$\mu$ (ethanol), $\epsilon$=15,600.

Calc.: C, 54.60; H, 5.68; Cl, 19.35. Found: C, 54.75; H, 5.62; Cl, 19.16.

EXAMPLE 4

Hydrocortisone-21-Chloral-Hemiacetal

By mixing 5 g. of hydrocortisone with 15 ml. of anhydrous chloral and following the procedure described in Example 1 except that the reaction mixture was left standing for two days, 6.4 g. of the desired product were obtained. By dissolving this product in acetone and adding petroleum ether, the desired substance was obtained with M.P. 175–178° C. and an U.V. max. at 242 m$\mu$ (ethanol), $\epsilon$=14,700.

EXAMPLE 5

Hydrocortisone-21-Chloral-Hemiacetal-Acetate 3 g. of hydrocortisone-21chloral-hemiacetal prepared as described in Example 4 were acylated following the procedure described in Example 3. Thereby 1 g. of the desired product was obtained. By dissolving this product in acetone and adding petroleum ether the substance was obtained with a M.P. of 185–190° C.

Calc.: C, 54.41; H, 6.03; Cl, 19.27. Found: C, 54.23; H, 6.23; Cl, 19.35.

EXAMPLE 6

Prednisolone-21-Chloral-Hemiacetal Acetate

To 3.0 g. of prednisolone were added 9 ml. of anhydrous chloral, and the suspension was placed in a shaking machine for 24 hours. The substance did not dissolve, but the suspension was gradually transformed to a solid cake. Ether and petroleum ether were added, and the substance was filtered off and washed with petroleum ether. Thereby 4.3 g. of prednisolone-21-chloral hemiacetal were obtained after drying at room temperature.

A mixture of 14 ml. of dry pyridine and 14 ml. of acetic anhydride was cooled in a $CO_2$/acetone bath. To the reaction mixture was added the aforementioned hemiacetal. By removing the cooling bath from time to time and shaking the flask, a clear solution was obtained which was left standing at −18° C. for 48 hours, whereafter it was poured into ice-water in which 19.5 g.

of sodium acetate had been dissolved. After stirring for ½ hour the solution was extracted with ether, the ethereal phase was washed 4 times with water, dried over $Na_2SO_4$ and evaporated to a small volume. After standing, the precipitated crystals were filtered off and dried at room temperature, thereby yielding 0.7 g. of prednisolone-21-chloral hemiacetal acetate. By dissolving in acetone and adding petroleum ether, an analytically pure substance crystallized having a M.P. of 208–209° C. The U.V. spectrum showed a maximum at 243 m$\mu$ (in ethanol), $\epsilon$=15,100.

Calc.: C, 54.60; H, 5.68; Cl, 19.35. Found: C, 54.80; H, 5.83; Cl, 18.97.

Following the procedure for the preparation of prednisolone-21-chloral hemiacetal described above, but using prednisone as starting substance, prednisone-21-chloral-hemiacetal was obtained with M.P. 121–123° C.

EXAMPLE 7

Cortisone-21-Phenoxyacetaldehyde Hemiacetal 8.0 g. of cortisone were dissolved at a temperature of about 50° C. in a mixture of 14 ml. of phenoxyacetaldehyde and 20 ml. of glacial acetic acid. After standing for 18 hours at room temperature, a little of ether was added and the solution was poured into petrolether, whereby an oily substance separated. The supernatant liquid was decanted from the oil, whereafter ether was added, and the mixture was stirred thoroughly. The ethereal phase was decanted from the remaining oil and poured into petrolether. The substance thereby precipitated was filtered off. After 10 treatments of the remaining oil with ether in the manner described above the total amount of oil had dissolved. By filtering off the substance precipitated by pouring the ethereal phase into petrolether and drying at room temperature, 7.2 g. in total of the desired substance were obtained showing in the infra-red spectrum (KBr tablet) the bands characteristic of the phenoxy group at 1505, 1595 and 1610 cm.$^{-1}$.

The U.V. spectrum showed maxima at 222 m$\mu$ and 239 m$\mu$ (in ethanol), $\epsilon$=16,800 and $\epsilon$=15,200.

EXAMPLE 8

Cortisone-21-Butyrchloral Hemiacetal

To 5.0 g. of cortisone were added 15 ml. of butyrchloral ($\alpha,\alpha,\beta$-tri-chlorobutyraldehyde) and the mixture was placed in a shaker for 18 hours. The suspension gradually jellied and later changed into a yellow vitreous mass. Ether and petrolether were added, and after stirring vigorously the substance formed was filtered off and washed with petrolether. After drying at room temperature, 5.5 g. of the desired substance were obtained. By dissolving in acetone and adding ether, the purified product precipitated, this product having M.P. 175–176°. The U.V. spectrum showed a max. at 238 m$\mu$ (in ethanol), $\epsilon$=15,800.

Calc.: C, 56.03; H, 6.21; Cl, 19.85. Found: C, 56.02; H, 6.32; Cl, 20.05.

Following the procedure described above, but using hydrocortisone as starting substance, hydrocortisone-21-butyrchloral hemiacetal was obtained with M.P. 190–193° C.

EXAMPLE 9

Hydrocortisone-21-Chloral-Hemiacetal Hemisuccinate

To a mixture of 30 ml. of dry pyridine and 6 g. of succinic anhydride in 30 ml. of dry methylene chloride were added 6 g. of hydrocortisone-21-chloral-hemiacetal. By shaking for a while, a solution was obtained which was left standing at room temperature for 17 hours. The solution was thereafter diluted with ether and subsequently washed twice with water, four times with diluted HCl acid and finally twice with water. The etheral phase thus obtained was dried with anhydrous sodium sulphate before evaporation on a waterbath in vacuo. The residue crystallized by trituration with ether. After filtering and drying, 1.6 g. of the desired substance was obtained with M.P. 195–196° C., and an U.V. max. at 241 m$\mu$, $\epsilon$=16,600.

Calc.: C, 53.17; H, 5.78; Cl, 17.44. Found: C, 53.04; H, 5.95; Cl, 17.14.

EXAMPLE 10

Compound Epi-F-11α-21-Dichloral-Hemiacetal Diacetate 5 g. of compound epi-F-($\Delta^4$-pregnene-11α-17α-21-triol-3,20-dione) were poured into 15 ml. of anhydrous chloral, and the mixture was placed in a shaking machine for 48 hours at room temperature. Thereafter the mixture was diluted with ether, filtered and while stirring vigorously poured into petroleum ether. The solid product precipitated was filtered off and washed with petroleum ether. After drying at about 20° C. the yield of the free hemiacetal was 7.6 g.

This substance was acylated as described in Example 3, and the oily residue thereby obtained was dissolved in a small amount of ethylacetate. The solution was left standing in a refrigerator, whereby the product precipitated in the form of crystals. These were filtered off and dried at room temperature. The yield of the desired compound was 1.6 g. and after recrystallization from ethyl acetate the M.P. was 221–224° C. The substance showed a maximum in the U.V. spectrum at 240 m$\mu$, $\epsilon$=17,300.

Calc.: C, 46.98; H, 4.90; Cl, 28.70. Found: C, 46.48; H, 5.03; Cl, 28.80.

What is claimed is:

1. Hydrocortisone-21-chloral hemiacetal hemisuccinate.
2. A compound selected from the group consisting of cortisone-21-phenoxy-acetaldehyde hemiacetal and its esters, selected from the esters of fatty acids having 1–4 carbon atoms, the cyclopenthyl propionate, the phenyl-propionate, the enanthiate, the glycolates, the succinates and the glutarate.
3. A compound selected from the group consisting of cortisone-21-butyr-chloral hemiacetal and its esters, selected from the esters of fatty acids having 1–4 carbon atoms, the cyclopenthylpropionate, the phenyl-propionate, the enanthiate, the glycolates, the succinates and the glutarate.

References Cited in the file of this patent

UNITED STATES PATENTS

| | | |
|---|---|---|
| 2,666,016 | Hechter | Jan. 12, 1954 |
| 2,736,733 | Rogers et al. | Feb. 28, 1956 |
| 2,783,226 | Gould et al. | Feb. 26, 1957 |
| 2,861,088 | Murray et al. | Nov. 18, 1958 |
| 2,933,514 | Borrevang | Apr. 19, 1960 |